United States Patent [19]
Kinsey

[11] 3,744,004
[45] July 3, 1973

[54] PRESS FIT OUTLET JUNCTION BOX WITH MEANS FOR DETACHABLY INTERLOCKING WITH ELECTRICAL CORD

[76] Inventor: Lewis R. Kinsey, 108 South 25th Street, Phoenix, Ariz. 85034

[22] Filed: Aug. 13, 1971

[21] Appl. No.: 171,459

[52] U.S. Cl............ 339/74 R, 339/122 R, 339/128, 339/157 R
[51] Int. Cl............................................ H01r 13/54
[58] Field of Search .................. 174/53, 58; 339/20, 339/21, 122, 123, 128, 157, 74

[56] References Cited
UNITED STATES PATENTS

| | | | |
|---|---|---|---|
| 2,162,864 | 6/1939 | Rugg et al.................. | 339/122 R X |
| 3,083,347 | 3/1963 | Fahey, Jr. .......................... | 339/88 C |
| 1,984,796 | 12/1934 | Hansen............................ | 339/128 X |
| 3,428,284 | 2/1969 | Trachtenberg et al. .......... | 174/58 X |
| 3,641,472 | 2/1972 | Phillips, Jr. ................. | 339/122 R X |

Primary Examiner—Richard E. Moore
Attorney—Warren F. B. Lindsley

[57] ABSTRACT

Electrical outlet receptacle adapted to be press fitted into an opening and provided with interlocking means for detachably connecting with the prongs of electric plugs.

7 Claims, 12 Drawing Figures

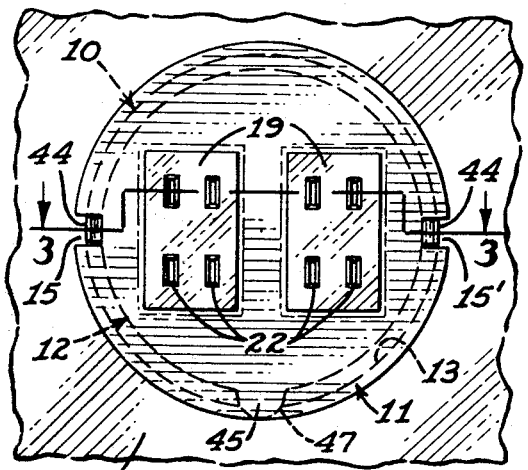
Fig. 1
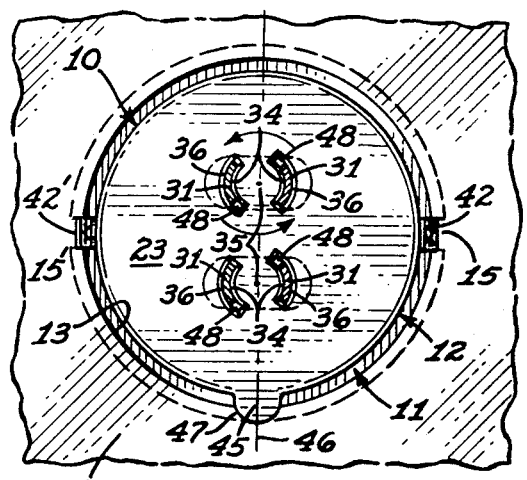
Fig. 2
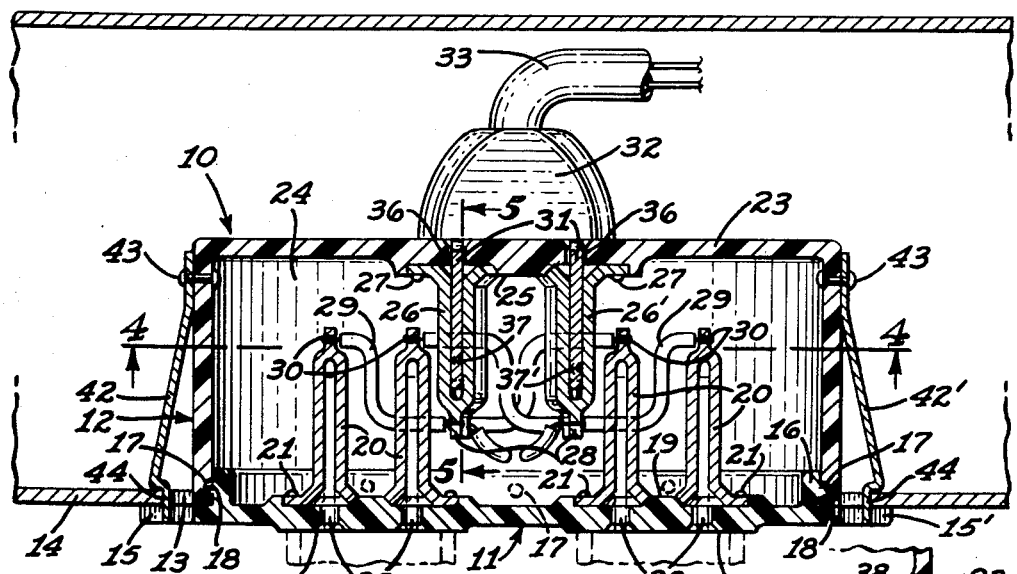
Fig. 3
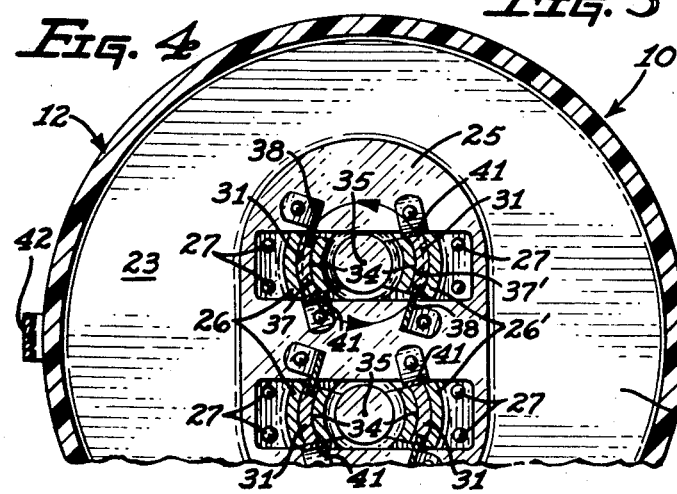
Fig. 4
Fig. 5
INVENTOR.
LEWIS R. KINSEY.
BY Warren F. B. Linsey
ATTORNEY.

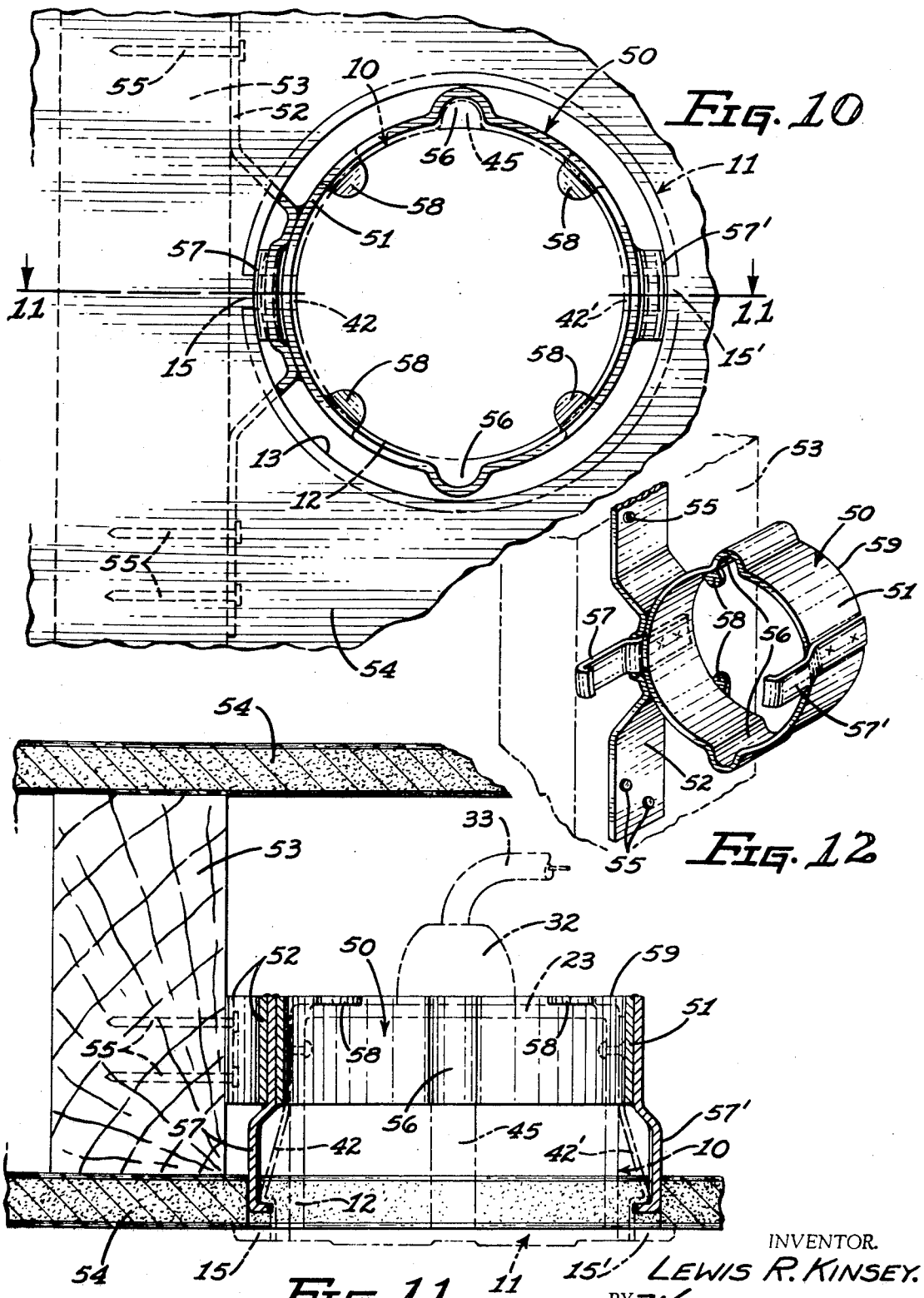

PRESS FIT OUTLET JUNCTION BOX WITH MEANS FOR DETACHABLY INTERLOCKING WITH ELECTRICAL CORD

BACKGROUND OF THE INVENTION

This invention relates to electrical receptacles, and more particularly to an electrical outlet receptacle adapted to be press fitted and held within a wall opening and which is provided with means for interlocking with the prongs of electric plugs inserted therein.

1. Field of the Invention

This invention is particularly directed to press fit junction boxes and plug-in cords for electrical wiring designed to save time and expense in the installation of electrical wiring in home, office, factory and farm construction.

2. Description of the Prior Art

Heretofore, numerous types of electrical junction boxes have been proposed and utilized with the majority of these providing binding posts or other threaded means for attaching wires within the boxes. In the case where automatic wire connecting means were provided, such means in many instances resulted in a relatively poor electrical contact and relatively minor misalignment of parts or wires resulted in considerable difficulty in inserting and attaching the wires to the junction boxes. Also, in many cases it was difficult to secure the junction boxes in place in the wall of the building. It is further noted that these prior art junction boxes usually could accomodate only a very limited range of wire sizes, and furthermore considerable skill and dexterity was necessary, both for installation of the junction boxes and for connecting wires thereto.

SUMMARY OF THE INVENTION

In accordance with the invention claimed, the junction box and electrical connections disclosed are designed to save time and expense in the installation of an electrical wiring system in homes, office buildings, factories, farm buildings and the like.

The cylindrical junction box shown is press fitted into a round hole cut into the wall and the connecting wires on its back side or rear are like extension cords which extend from one junction box to the next and are automatically locked into position when pressed straight into the junction box. The back side of this junction box is made for a special push-in snap-lock fitting which is not interchangeable with the standard cord and plug fittings normally used on electrical lamps and appliances inserted into the front or face of this junction box.

The junction box disclosed may be made of metal or plastic and the components on the inside are mounted so it can be plugged into from both the front and the back of the junction box. It is made, completely equipped, and more or less sealed at the factory.

After the round hole is made in the wall of the building, the extension cords (special interior cords) are placed inside the wall panel. These interior cords are then plugged into the back of this junction box and the box is then simply pressed into the wall. The cover on the box is larger than the box so it acts as a stop and face for the box.

Each junction box is provided with two leaf snap-springs, one on each side of the junction box. When the box is pressed into the wall these snap-springs prevent the box from coming back out. For repair or replacement the boxes can be removed simply by depressing the tips of the springs, which extend through slots in the face plate of the box.

Junction boxes can be equipped with several different electric fittings, with each junction box of a particular type given a number. When the internal fittings are different the box is given a different number. The builder simply selects the number of each type he needs.

The internal extension cords can and should be factory made in many lengths and completed with a male plug at each end. For safety, each plug of the internal electrical cords moves straight into the junction box with a snap-lock spring fit. Locking means in the junction box engage and hold the prongs on each electrical plug and prevent the cord from being accidentally pulled out, thereby breaking the electrical connection inside the wall of the building.

In order to remove or disconnect any of these internal extension cords for repair or replacement, it is only necessary to turn the plug a little to the left, which releases the spring locking means and frees the plug to move out of the junction box.

To simplify the electrical wiring in the building, the builder simply selects the right number and type of junction boxes for the selected positions in the building and the right number and length of each extension cord needed to make the connection between the various junction boxes. The builder then simply follows his previously made plan and completes the electrical house wiring by interconnecting the junction boxes together with the internal extension cords.

This ready made, easy and rapidly installed house wiring system is usable in the aluminum home disclosed in U.S. Pat. No. 3,452,498. However, the disclosed press fit round junction boxes and internal extension cords utilized therewith will work in any building project.

As is quite apparent, the installation of the disclosed electrical house wiring system requires no special electrical training and skill and requires no tools.

When this disclosed junction box is used in a conventional building or trailer with a wooden frame employing plaster or plaster board walls, the disclosed holder or clamp is fastened to the wood studs of the building and they receive the junction box in a snug fit to secure the junction box in a hole in the wall with no pressure on the walls itself.

It is, therefore, one object of this invention to provide an improved electrical junction box and plug-in accessory which may be supplied in pre-assembled condition for convenient installation in a building with the wires being connected and locked to the junction box by merely inserting the same in openings provided therefor.

Another object of this invention is to provide an improved junction box for press fitting into a circular opening in a wall, the mounting of the box requiring no screws or other manually fastening means.

A further object of this invention is to provide a receptacle durable in construction, the installation of which can be accomplished rapidly and with a minimum of labor requiring no tools.

A still further object of this invention is to provide an electric outlet receptacle or junction box having a cylindrical configuration which may be press fit and locked into a round hole in a building wall and utilized together with locking plug-in cords of various lengths to further provide a novel and complete wiring system. This system may be quickly and easily installed in any type of building structure such as conventional houses, thin wall metal houses, mobile homes and the like.

A still further object of this invention is to provide a new and improved clamp for fastening to the studs of a wall for receiving in a snug-like fit the disclosed junction box extending through a hole in the wall.

Further objects and advantages of this invention will become apparent as the following description proceeds and the features of novelty which characterize this invention will be pointed out with particularity in the claims annexed to and forming part of this specification.

BRIEF DESCRIPTION OF THE DRAWINGS

FIG. 1 is a front elevational view of an electric outlet receptacle installed in a wall of a building structure;

FIG. 2 is a rear elevational view of the receptacle shown in FIG. 1;

FIG. 3 is an enlarged transverse sectional view through the wall structure and receptacle, taken substantially on line 3—3 of FIG. 1;

FIG. 4 is an enlarged vertical sectional view through the cylindrical receptacle taken substantially on the line 4—4 of FIG. 3;

FIG. 5 is an enlarged vertical sectional view-through one of the in wall plug-in components taken on line 5—5 of FIG. 3;

FIG. 9 is an enlarged rear elevational view showing how a plurality of interior extension cord plugs may be located and plugged in.

FIG. 10 discloses a front view of a clamp fastened to a wall stud for receiving and holding in a snug fit the junction box shown in FIGS. 1-9;

FIG. 11 is a cross sectional view of FIG. 10 taken along the line 11—11 with the junction box shown in dot-dash lines; and FIG. 12 is a perspective view of the clamp shown in FIGS. 10 and 11.

DESCRIPTION OF THE PREFERRED EMBODIMENT

Figure 6:
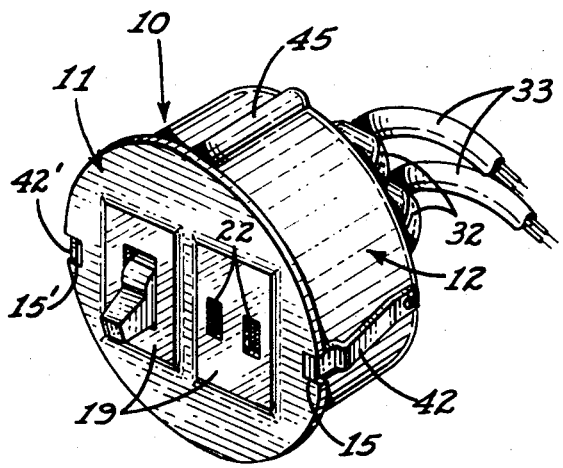
FIG. 6 is a perspective view showing one form of the cylindrical outlet receptacle of this invention, removed from the wall and rotated 180° to illustrate the relative location of an integral lug which normally prevents rotation of the receptacle when installed in a wall.
Figure 8:
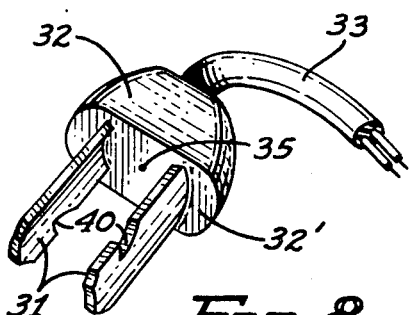
FIG. 8 is an enlarged perspective view showing the preferred type of plug which is integrally attached to the ends of all internal extension cords.

Referring now to the various views of the drawings for a more detailed description of the construction and other features of the invention by characters of reference, FIGS. 1-5 illustrate a cylindrical receptacle or junction box 10 comprising a cover plate 11 and a cylindrical housing 12, both of which are preferably formed of high impact strength, electrically insulative plastic material. The cover plate and housing are adapted to be permanently assembled to form a contiguous one-piece construction such as the receptacle or junction box 10, which may be securely installed in or quickly removed from a preformed circular opening or cut-out 13 in a structural wall 14.

Cover plate 11 is preferably circular in shape and substantially flat surfaced having a diameter somewhat larger than the diameter of the cut-out 13 in wall opening 14, which it is adapted to cover when installed, as shown in FIGS. 1 and 3. A pair of diametrically opposed rectangular cut-outs 15 and 15' are provided in the periphery of cover plate 11, the purpose of which will hereinafter appear.

The inside face of cover plate 11 is provided with an inwardly projecting integral circular flange 16 having a plurality of equally spaced projections are adapted to match and engage similar shaped depressions 18 formed in the inner peripheral surface of the cylindrical housing 12 to securely lock cover plate 11 and housing 12 together to form a single unit. It should be noted that other methods of uniting cover plate 11 and cylindrical housing 12 into a single unit could be utilized, such as by cementing or welding if so desired.

Cover plate 11 is thickened and strengthened by providing inward and outward projecting ridges 19 for supporting conventional plug prong receiving contact fixtures 20. Contact fixtures 20 are rigidly secured to the inner face of cover plate 11 by riveting or otherwise as indicated at 21. The flat front faces of ridges 19 are provided with conventional rectangular chambered slots 22, which extend through cover plate 11 in alignment with the openings in contact fixtures 20. Slots 22 are arranged to receive the usual contact prongs of electrical plugs which are attached to television sets, lamps, or other appliances in the conventional manner.

Cylindrical housing 12 of receptacle or junction box 10 comprises an integral, flat end wall or rear 23 which together with the cover plate 11 when assembled as previously described provides a substantially sealed enclosure 24. This enclosure is adapted to safely house or contain all the electrical fixtures, wiring or other components required for that particular receptacle or junction box without electrical shock hazard when handling the unit. However, since the internal electrical cords used with these junction boxes have a male plug at each end, the master switch must be turned off while installing or replacing any of these internal cords.

End wall or rear 23 is preferably thickened and thereby reinforced by providing flat inwardly projecting ridge like surfaces 25 wherever plug type prong receiving fixtures 26 and 26' are riveted or otherwise rigidly secured thereto as indicated at 27 in FIG. 3. Ends 28 of fixtures 26 and 26' are electrically connected by suitable wiring 29 to ends 30 of the conventional prong receiving fixtures 20 mounted on surfaces 19 of cover plate 11 and project into enclosure 24. This wiring provides the necessary electrical connections therebetween, all enclosed in the sealed receptacle or junction box 10.

It should be understood that mounting of fixtures 20, 26, 26' and the interconnecting wiring 29 is to be accomplished before cover plate 11 and cylindrical housing 12 are assembled to form a single unit receptacle or junction box and that the inter-connecting wiring 29 be of sufficient length to accomplish this purpose.

The prong receiving fixtures 26 and 26' are especially designed to receive in electrical contact relation a pair of novel arcuate shaped metallic plug prongs 31. These prongs are integral with and project outwardly from suitable plugs 32 which are attached to the ends of current carrying heavy duty cords 33 which deliver electric current to the receptacle or junction boxes 10. Prongs 31 are adapted to electrically connect metallic receiving fixtures 20 and thence to the appliances or fixtures which may be electrically connected thereto.

Plug prongs 31 are installed integrally with plugs 32 with their inner concave faces 34 spaced radially an equal distance about center 35 of the plug. Each pair of prongs is of sufficient length to extend through a pair of matching arcuate slots 36 formed in end wall or rear 23, and almost to the closed ends of matching arcuate elongated slots or passages 37 and 37' formed by the curved split walls of the prong receiving fixtures 26 and 26'. The thickness or gauge of the metal forming prongs 31 is intended to provide a snug fit in arcuate slots 37 and 37', thereby assuring good electrical contact with the flexible walls of these slots; but to also allow for rotative movement of the prongs within the slots in either a clockwise or counter-clockwise direction.

Directly above and below and centered radially over and under the arcuate slots 37 and 37' formed by prong receiving fixtures 26 and 26' are suitably mounted interlocking members 38. Members 38 are provided on their underside edges with projecting tabs 39, as shown in FIG. 5, which are adapted to engage in notches 40 formed in the top and bottom edges of the pair of prongs 31 forming a given plug to securely lock the prongs and hence their retaining plugs 32 in positive electrical contact within the receptacle or junction box 10. This interlocking occurs by the proper application of straight inward thrust.

Suitably mounted directly above and below and in radial alignment with the respective arcuate slots 37 and 37' on end wall 23 are a pair of flexible curved spring members 41. Each spring member is adapted to normally bear against the open end on one of the arcuate slots 37 and 37', thereby yieldingly resisting rotative movement of prong members 31 about the centers of their plugs 32. This action locks the prongs in the junction box and prevents any longitudinal movement of the prongs within their respective slots.

Each receptacle or junction box 10 is provided with a pair of diametrically opposed flat leaf springs 42 and 42', which are suitably secured at their inner ends as by rivets 43 to housing 12. Springs 42, 42' extend forwardly adjacent the cylindrical wall of the housing 12 a sufficient distance to allow their inwardly bent ends 44 to engage the circular edge of opening 13 in wall 14 and to move laterally inwardly or outwardly in the rectangular cut-outs 15 and 15' in the front cover plate 11 as clearly shown in FIG. 3.

Figure 7:
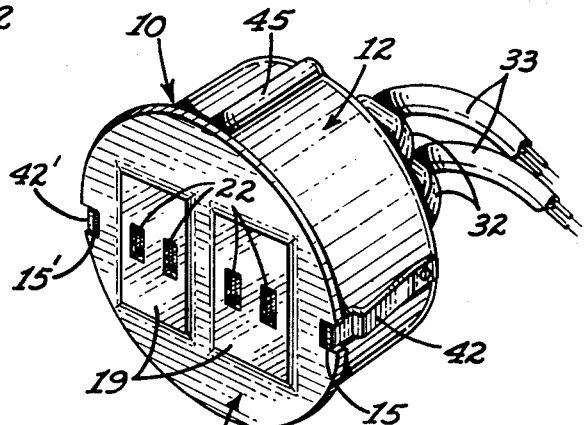
FIG. 7 is a perspective view similar to FIG. 6, showing another form of the cylindrical outlet receptacle of this invention.
Figure 9:
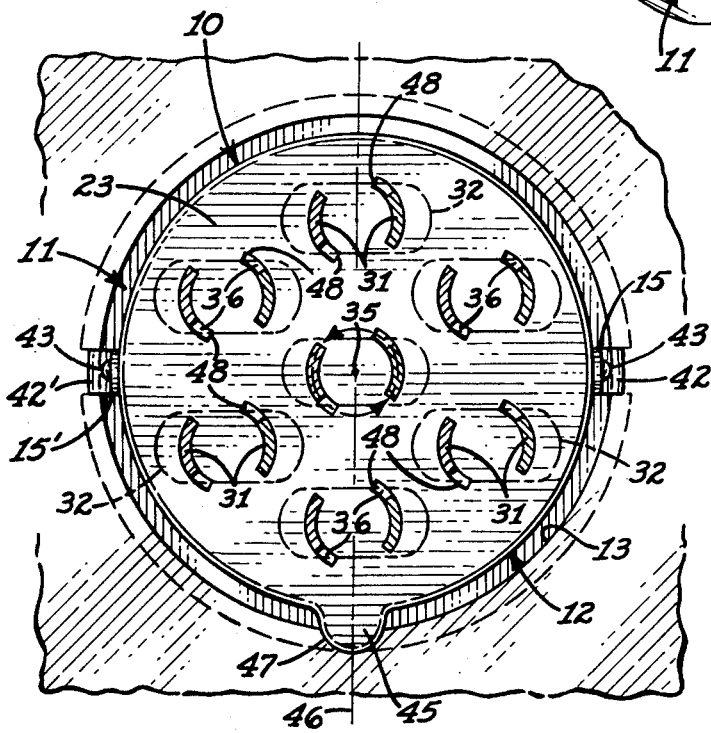

Each receptacle or junction box 10 is also provided with a semi-circular projection 45 shown in FIGS. 6 and 7 which may be an integral part of cylindrical housing 12. This projection is preferably located on a diameter 46 of the housing projecting outwardly from the bottom perimeter thereof as shown in FIGS. 2 and 9. Projection 45 is adapted to slidably engage a similar semi-circular shaped cut-out 47 provided in the bottom edge of the circular openings 13 in the wall 14 to prevent rotation of the receptacle or junction box 10 after installation of the unit in the wall.

It should be noted, by reference to FIGS. 2 and 9, that the opposed arcuate slots 37 in the end wall or rear 23 of junction box 10 for receiving the arcuate prongs 31 of plugs 32 extend radially beyond and as indicated at 48 are slightly wider than the width of the prongs themselves, to allow for slight rotational movement of the prongs 31 within arcuate slots 36.

Having thus described the construction, fabrication, assembly and other features of the receptacle or junction box 10 and the internal plug-in cords used in conjunction therewith to provide the complete wiring system of this invention, the following operating procedures should be considered when installing and removing the various components from a wall of a building or other structure.

The user of this novel wiring system should note the locations for installing the wiring system and then proceed to cut the necessary circular openings 13 in wall 14 at the desired location of each receptacle or junction box 10 intended to be installed. Openings 13 should be slightly larger in diameter than cylindrical housing 12, with each opening being provided with a semi-circular notch or cut-out 47, as previously described. The internal cords 33 of the proper lengths to extend within the wall structure, between the various openings 13 should then be installed, allowing the plug ends of the cords to extend through the wall cut-outs 13 and somewhat beyond the wall surface.

The arcuate prongs 31 of plugs 32 should then be inserted into the arcuate slots 36 in the end walls or rear 23 of the junction boxes 10 and pushed into the arcuate slots 37 and 37' of the prong receiving fixtures 26 and 26' until the outer faces 32' of the plugs 32 engage the rear faces of end walls 23. After the prongs 31 have been inserted into the respective receiving slots as described, it is only necessary to push them straight into the receptacle in the same manner as the standard plugs on the front of the receptacle. There is one difference, however. When plugs 32 are pushed straight into the receptacle the prongs 31 will pass over the ends of the projecting tabs 39 of the extension 38 which are in a fixed position by pressing against and overcoming the spring pressure of springs 41. When the prongs are all the way in, projecting tabs 39 will snap into notches 40 and springs 41 will lock tabs 39 in notches 40 with a snap-lock fit. This will prevent the internal cords from being accidentally pulled out, thereby breaking the electrical circuit. In order to remove or disconnect any of these internal extension cords for repair or replacement, it is only necessary to first give the plug a little left or counter-clockwise turn, which will overcome the tension of the springs 41 and release tabs 39 from slots 40, thereby releasing plug 32 from the junction box.

When the electrical current carrying internal cords 33 and their respective plugs 32 have been secured and locked as described above in the receptacle or junction box 10, the particular box may be easily inserted into the circular wall openings 13. The movement of the junction box 10 with its semi-circular projection 45 guided in the semi-circular cut-out 47 in the wall 14 causes the flat leaf springs 42 and 42' to be depressed, relieving their pressure on the inside perimeter of the circular cut-out 13. This action permits box 10 to be inserted in the wall openings until the flat inner face of the front cover plate 11 comes into flush contact with the outer face of wall 14. The outer ends 44 of leaf springs 42 and 42' enter the rectangular cut-outs 15 and 15' in the cover plate 11 and move outwardly against the inner edge of the opening 13 to thereby securely lock box 10 in the wall. This hardware configuration is intended to prevent rotational movement of the boxes within their respective wall openings by the use of the semi-circular projection 45 which engages a similar shaped cut-out 47 in opening 13. The cover plate 11 being of greater diameter than the circular opening 13 in wall 14 covers the clearance space between the installed box 10 and opening 13 to present a neat finished appearance after the installation has been completed.

If it is desirable to remove and replace any particular receptacle or junction box 10, it is only necessary to reverse the installation procedure described above, that is, the outer ends of springs 42 and 42' need only to be pressed inwardly in the rectangular cut-outs 15 and 15' in the cover plate 11 to dislodge these spring ends from contact with the inside edge of the wall opening 13 to allow the entire box 10 to be removed from the wall or partition in which it was previously installed. The internal cords 33 with their plug ends 32 can then be easily removed by simply rotating the prongs slightly in a counter-clockwise direction, depressing the curved spring members 41 and causing the arcuate prongs 31 to clear the projecting locking tabs 39 and thereby permitting complete withdrawal of plugs 32 from the receptacle or junction box 10.

It should be recognized that the junction box, its contents and the plugs may be designed so that the prongs of the plug ends of the cords may be rotated slightly in a clockwise direction to permit withdrawal of the plugs from the junction box if so desired.

FIGS. 10, 11 and 12 illustrate a clamp or holder 50 for receiving and holding the junction box 10 shown in FIGS. 1–9.

This holder comprises an open cylindrical body member 51, open at both ends, which is provided with a strap 52 suitably fastened to the outer circumference of the cylindrical body member 51 for fastening to a stud 53 of a wall 54 by nails 55 or any other fastening means. The holder is provided with semi-circular indentations 56 for receiving the semi-circular projections 45 in the same manner that projections 45 of the junction box 10 were received by semi-circular cut-outs 47 in wall 14.

Mounted along the outside surface of the cylindrical body member 51 of holder 50 is a pair of finger-like clamps 57, 57' which are arranged to engage with flat leaf springs 42, 42' of junction box 10 to lock junction box 10 in the holder. A plurality of tabs 58 are spacedly arranged around the back end 59 of the holder and extending inwardly of its periphery to stop the junction box from moving through the holder.

Thus, by cutting a hole in a plaster or plaster board wall 54 and mounting the holder 50 immediately therebehind on stud 53, the holder is in position to receive junction box 10 in the manner shown in FIG. 11. This holder makes it possible to utilize the claimed junction box in a building utilizing plaster walls in a snug fitting manner without using fastening means that engage the plaster wall.

The inventive concept of a prong holder mounted in a cylindrical shaped housing for receiving therein one or more prongs and interlocking therewith can be applied to the mating ends of two connectable electrical cards.

Although but one embodiment of the invention has been shown and described, it will be apparent to those skilled in the art that various changes and modifications may be made therein without departing from the spirit of the invention or from the scope of the appended claims.

I claim:

1. An electrical receptacle for installation in a cavity behind an exposed surface of a building, said receptacle comprising:
   a cylindrical shaped housing having front and rear ends, said front end being arranged substantially flush with the opening in said surface of said building,
   a first socket holder fitted into said receptacle and having prong receiving sockets embedded therein,
   said prong receiving sockets communicating with openings in said rear end of said housing for receiving the prongs of an electric cord,
   said prong receiving sockets and said openings in said rear end of said housing being of similar arcuate configuration,
   means mounted within said housing adjacent said socket holder for interlocking with prongs of an electric plug inserted through said openings in said rear end of said housing for firmly holding said prongs in said receptacle,
   said means for interlocking with prongs of an electric plug comprising arm members extending from the closed end of said housing inwardly thereof and provided with tabs along its length one engaging with an indentation in each of the prongs of the electric cord upon inserting of said prongs in said receptacle,
   said interlocking means being rendered ineffective upon a predetermined rotatable movement of the prongs in said openings in said housing.

2. The electrical receptacle of claim 1 wherein said interlocking means is rendered ineffective upon predetermined rotatable movement of the prongs in the opening in the housing by moving out of the indentation in the prongs.

3. The electrical receptacle of claim 1 in further combination with:
   a pair of spring clips fixedly mounted at diagonal positions on the outside of said housing, each of said spring clips comprising an arm member fixed at one end to said housing and free to flex outwardly from said housing at the other end,
   an open cylindrical holder for receiving said receptacle,
   said holder being provided with a strap attached to its outside surface for attaching to studding behind the exposed surface of the building, and a pair of clips fixedly mounted at diagonal positions on the outside surface of said holder, each of said clips engaging and interlocking with a different one of said arm members for holding said receptacle in said cavity and flush with the exposed surface of the building.

4. The electrical receptacle set forth in claim 3 wherein said arm members of said spring clips interlock with said clips of said holder within the cavity extending through the exposed surface of the building.

5. The electrical receptacle of claim 3 in further combination with a cover plate mountable over the front end of said receptacle for sealing closed said housing, said cover plate having a second socket holder fastened thereto for extending within said housing, and means for electrically connecting with said housing said second socket holder to said first socket holder.

6. The electrical receptacle of claim 1 wherein said interlocking means is rendered ineffective upon predetermined rotatable movement of the prongs in the opening in the housing by moving out of the indentation in the prongs.

7. An electrical receptacle for connecting together in an interlocking arrangement two electrical cords, said combination comprising:
- a cylindrical shaped housing having first and second ends, said first end being connected to one of an electric cord,
- a first socket holder fitted into said housing and having prong receiving sockets embedded therein for connection to said one end of said cord,
- said prong receiving sockets communicating with openings in said second end of said housing for receiving the prongs of a second electric cord,
- said prong receiving sockets and said openings in said second end of said housing being of similar arcuate configuration, and
- means mounted within said housing adjacent said socket holder for interlocking with prongs of an electric plug fastened to said second electric cord inserted through said openings in said second end of said housing for firmly holding said prongs in said housing,
- said means for interlocking with prongs of an electric plug comprising arm members extending from the closed end of said housing inwardly thereof and provided with tabs along its length one engaging with an indentation in each of the prongs of the electric cord upon inserting of said prongs in said receptacle,
- said interlocking means being rendered ineffective upon a predetermined rotatable movement of the prongs in said openings in said housing.

* * * * *